April 24, 1928.

V. A. FYNN 1,667,514

SYNCHRONOUS MOTOR

Original Filed Nov. 26, 1923

Inventor:
VALÈRE ALFRED FYNN,
By John W Bruninga
His Attorney.

Patented Apr. 24, 1928.

1,667,514

UNITED STATES PATENT OFFICE.

VALÈRE A. FYNN, OF ST. LOUIS, MISSOURI.

SYNCHRONOUS MOTOR.

Original application filed November 26, 1923, Serial No. 677,157. Divided and this application filed August 2, 1926. Serial No. 126,886.

This application is a division of my former application, Serial Number 677,157, filed November 26, 1923, patented Sept. 14, 1926, Patent No. 1,599,754.

My invention relates to synchronous motors and more particularly to machines possessing the mechanical features of induction motors and capable of carrying variable load at synchronous speed. Machines capable of operating synchronously at a plurality of loads but having the mechanical features of induction motors are often referred to as synchronous induction motors.

In my original application I have shown among other things how machines of the type indicated above could be provided with a continuous or a constant synchronizing torque and how such machines could operate or could be made to operate synchronously at a plurality of loads. The expression continuous synchronizing torque covers a constant torque as well as a torque which is not constant in magnitude but which is always positive. The present application is directed more particularly to subject matter disclosed in connection with Figs. 4 and 5 of the parent application which are reproduced herein.

The objects and features of this invention will appear from the description and drawings and will be more particularly pointed out in the claims.

Figure 1:
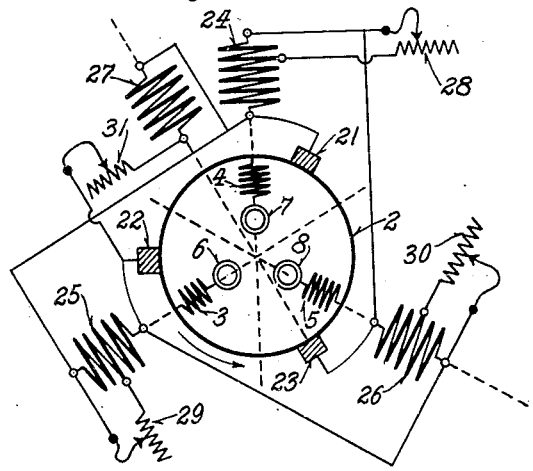
Figure 2:
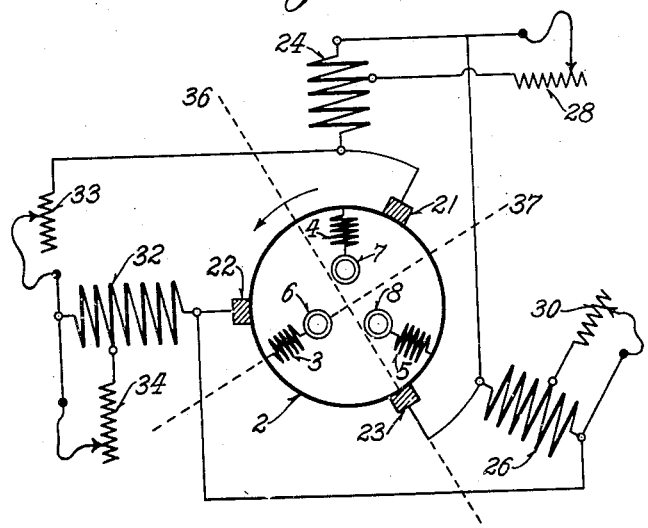

The accompanying diagrammatic drawings, Figs. 1 and 2 show two-pole synchronous motors embodying my invention.

Referring to Fig. 1, the rotor, here the primary, carries a commuted winding 2 and three-phase star connected windings 3, 4, 5 which are combined with the commuted winding to form the primary of the machine. This primary winding can be connected to the supply by means of the slip-rings 6, 7, 8. The commuted winding may, in this connection, be looked upon as a mesh connected three-phase winding to three points of which the windings 3, 4, 5 are connected as shown. It is well understood that the commuted winding may be entirely separate from the primary winding. Brushes 21, 22, 23 displaced by 120 electrical degrees cooperate with the commuted winding and are shown as resting directly on the circle representing said winding. In practice a commutator would be interposed but by showing the brushes in direct contact with the winding all indefiniteness as to their location with reference to other elements of the machine is avoided. The stator, here the secondary, carries four windings 24, 25, 26 and 27. The axis of the winding 24 is parallel to the line along which the brushes 21, 23 are located and 24 is connected to the brushes 21, 23. The winding 24 is in fact just as coaxial with the line along which the brushes 21, 23 are located as if said line coincided with the axis of 24 instead of being only parallel to it. The winding 25 is coaxial with the brushes 21, 22 and connected to same, while the winding 26 is coaxial with the brushes 22, 23 and connected to said brushes. The winding 27 is connected to the brushes 21, 22 as is the winding 25 but 27 is displaced from the axis of said brushes by 90 electrical degrees. These windings are shown as having different numbers of turns, this is mostly desirable but not necessary.

A part of each of the windings 24, 25, 26 can be shunted by an adjustable resistance 28, 29, 30 and an adjustable resistance 31 is located in circuit with the brushes 21, 22 and the winding 27. The magnetizing means or windings 25, 27 are connected in parallel to the brushes 21, 22 and brush currents sent into these windings produce a resultant magnetization the axis of which does not coincide with the axis of either component winding. It is well understood in this art that the three brushes shown can be replaced by an equivalent of six brushes. Two of these can be located in the axis of 24 and connected to it. Two others in the axis of 26 and connected to 26 and the two last in the axis of 25 and connected to 25 as well as to 27.

Fig. 2 differs from Fig. 1 in that the secondary windings 25 and 27 of Fig. 1 have been replaced by a single winding 32 located in the axis of the resultant magnetization due to 25 and 27. In Fig. 2 the brushes 21, 22, 23 are displaced by 120 electrical degrees as in Fig. 1, the winding 24 is coaxial with the brushes 21, 23 to which it is connected, the winding 26 has the same axis as the brushes 22, 23 to which it is connected but the winding 32 is not coaxial with the brushes 21, 22 to which 32 is connected. The secondary windings 24 and 32 are displaced by 90 electrical degrees, the secondary windings 24 and 26 by 120 and the secondary windings 26 and 32 by 150 electrical degrees. The three secondary magnetizations produced by conduced currents in Fig. 2, say in synchronous operation, are accordingly displaced by 90, 120 and 150 electrical degrees while the three groups of brushes which are connected to the three sets of secondary magnetizing means and which cooperate with said means to produce the three magnetizations in question are displaced one from the other by the uniform angle of 120 electrical degrees. Part of the secondary windings 24, 26, 32 can be shunted by the adjustable resistances 28, 30, 34 and the adjustable resistance 33 is located in circuit with the winding 32 and the brushes 21, 22. The three secondary windings are shown dimensioned to produce magnetizations differing considerably in magnitude, the winding 32 being adapted to produce the greatest magnetization.

As to the mode of operation, particularly of Fig. 1, the motor can be started as a polyphase induction motor by connecting the sliprings 6, 7, 8 to the supply and leaving the circuit of 27 open at 31. By shunting part of the windings 24, 25, 26 in which the primary flux set up by the primary winding 3, 4, 5, 6 generates working voltages, the commutator can be relieved of at least part of the working currents during the starting period, these resistances can also be used to secure a substantially uniform induction motor torque particularly when the secondary windings are not all alike. As synchronism is approached the generated voltages in 24, 25, 26 diminish becoming zero at synchronism, they cannot synchronize the motor. But the auxiliary or commutator brush voltages are of slip frequency at all times and become unidirectional at synchronism and have a magnitude which is independent of the speed of the primary, as is now well understood. These auxiliary voltages are impressed on the secondary windings and as synchronism is approached send increasingly effective conduced currents into the windings 24, 25, 26. These currents set up ampereturns in 24, 25, 26 which can be regulated by means of the resistances 28, 29, 30 and said ampereturns cooperating with the primary flux produce three phase-displaced synchronizing torques. Because the three auxiliary voltages are of equal amplitude the conduced ampereturns in 24, 25, 26 will have equal amplitudes if the impedance of their circuits and their number of turns are alike. If said impedances or said number of turns are different, the conduced ampereturns in 24, 25, 26 will be different.

The configuration of the synchronizing torque depends on the relative position of the axis of a secondary winding and of the axis of the brushes connected to said winding, or, more broadly, on the phase of the auxiliary voltage impressed on a secondary with relation to the phase of the voltage concurrently generated in said secondary by the primary flux. A strictly unidirectional and pulsating synchronizing torque is had when the secondary winding is coaxial with the axis of the brushes connected to it, or when the auxiliary voltage is cophasal with that concurrently generated in the secondary on which said voltage is impressed. When the brush axis is displaced 90 electrical degrees from the axis of the winding, or when the auxiliary voltage differs by 90 degrees from the phase of the generated voltage the synchronizing torque is of double slip frequency of the motor or of double the frequency of the auxiliary voltage and has equal positive and negative maxima. In this last case it is preferred to have the auxiliary voltage lead the generated voltage.

In Fig. 1 the axes of the three groups of secondary brushes and the corresponding secondary windings are coaxial with the result that each secondary produces a strictly unidirectional synchronizing torque. The sum of the three synchronizing torques is a synchronizing torque of practically constant magnitude if the conduced ampereturns in 24, 25, 26 are alike. If they are not, the resultant synchronizing torque will be continuous but not constant, it will always be positive but will vary in magnitude. A constant synchronizing torque will bring the motor up to synchronism but will not hold it there at more than one load. If the motor has been synchronized with a constant synchronizing torque it is necessary to close the circuit of 27 to cause the motor to operate synchronously at a plurality of loads. The closing of the circuit of 27 does two things; it increases the conduced ampereturns of the means for magnetizing the secondary connected to one group of brushes, namely to the brushes 21, 22, and, therefore, increases this secondary magnetization as compared with those produced by 24 and 26, and it displaces the axis of this increased magnetization with respect to the axes of the other two secondary magnetizations. This disturbs the symmetry of the arrangement of brushes and cooperating secondary windings and causes the motor to operate synchronously at a plurality of loads. If the motor has been synchronized with a continuous but not a constant synchronizing torque it will operate synchronously at a plurality of loads even though the winding 27 is not rendered effective but the addition of 27 will, in most cases, increase the synchronous range of the machine and improve its synchronous characteristic. The circuit of the winding 27 can be closed at starting, when it is likely to somewhat unbalance the induction motor torque, or it can be closed just before synchronism is reached when it may disturb the constancy of the synchronizing torque or cause a continuous synchronizing torque to vary through a greater range of values, but the machine is quite operative in any of these combinations.

In Fig. 2 the axes of the secondary magnetizations are permanently displaced by angles other than the axes of the brushes to which the means producing said magnetizations are connected and the motor there shown therefore starts with an induction motor torque which is not constant, synchronizes with a torque which is not constant but operates synchronously at a plurality of loads. The starting, synchronizing and synchronous operating conditions can each be improved to some extent by manipulating the resistances 28, 30, 33 and 34 along the lines previously indicated in this specification.

In order to get the full benefit of the combination of elements herein disclosed, it is necessary to make the stationary as well as the revolving member without defined polar projections just as is usual in the case of polyphase induction motors, and I also prefer to build and operate these machines with a short air-gap or small clearance between the two members. The stationary member should be built like a stator, the revolving one like a rotor.

It is to be understood that by "synchronizing torque" I mean that torque which brings a synchronous motor up to synchronism, i. e., up to that speed which is determined by the number of poles of the machine and the frequency of the supply. It is known that an induction motor operates by virtue of secondary currents induced or generated in the secondary windings and that these currents and therefore the induction motor torque become zero at synchronism. Specifically in the case of motors started as induction motors and operated as synchronous motors, the synchronizing torque is one which is superposed on the said induction motor torque and does not become zero at synchronism, but preferably increases as synchronism is approached. The synchronizing torque is not to be confused with the "synchronous torque" or with that prevailing when the machine operates as a synchronous motor. The former has heretofore been a pure alternating torque with equal positive and negative maxima, I have elsewhere shown how a unidirectional or a substantially unidirectional synchronizing torque can be produced, in this application I show how a constant or a more or less constant but continuous synchronizing torque can be secured.

It is further to be understood that by "synchronous motor" is meant one which operates at a constant synchronous speed over a range of loads, and not, for instance, an adjustable speed asynchronous induction motor, the speed of which changes with every change of load, and which for certain settings may pass through synchronism in the course of its operation. The fact that it so passes through synchronism does not, of course, rob it of its distinguishing and inherent variable speed characteristic.

The synchronous motors described in this specification carry unidirectional ampereturns on their secondary, the resultant of which is referred to as F, and unless the organization of the machine is such as to permit, with changing torque demand (1) of an angular displacement between the axis of F and the axis of the resultant motor magnetization R, or (2) of a change in the magnitude of F, or (3) of said angular displacement and of said change in magnitude, the motor cannot and does not run at a constant and synchronous speed under varying load conditions and is not a synchronous motor.

When the primary is stationary the revolving flux revolves synchronously with respect to it and the secondary revolves in the same direction as this revolving flux. In asynchronous operation, the speed of the secondary is a little short of that of the revolving flux; at synchronism the speed of the secondary is the same as that of the revolving flux. In applying this invention to a stationary primary, the brushes cooperating with the commuted winding on the primary must revolve with the secondary but the operation of the machine will be as here explained for the converse arrangement.

It will be clear that various changes may be made in details of this disclosure without departing from the spirit of this invention, and it is, therefore, to be understood that this invention is not to be limited to the specific details here shown and described.

What I claim is:

1. A synchronous motor which carries variable load at synchronous speed, having a primary and a secondary member, said primary member being adapted to produce a primary flux which revolves with respect to the primary, a commutator on said primary, brushes located along $n$ displaced axes, means on the secondary adapted to produce $n$ displaced magnetizations, each of said means being connected to brushes located along one of the $n$ brush axes to set up conduced ampereturns in the said magnetizing means, different magnetizing means being connected to brushes located along different axes, and the angular displacements between the $n$ brush axes differing from the angular displacements between the $n$ secondary magnetizations produced by the conduced currents.

2. A synchronous motor which carries variable load at synchronous speed, having a primary and a secondary member, said primary member being adapted to produce a primary flux which revolves with respect to the primary, a source of $n$ auxiliary voltages, said voltages being of slip frequency and of different phases at sub-synchronous motor speeds, becoming unidirectional at synchronism and having an amplitude independent of their frequency, means on the secondary adapted to produce $n$ displaced magnetizations, means for impressing one auxiliary voltage on each of said means to set up conduced ampereturns in the said magnetizing means, different auxiliary voltages being impressed on different magnetizing means, and the phase displacements of the $n$ auxiliary voltages, expressed in degrees, differing from the space displacements expressed in electrical degrees, the $n$ secondary magnetizations produced by the conduced currents.

3. A synchronous motor which carries variable load at synchronous speed, having a primary and a secondary member, said primary member being adapted to produce a primary flux which revolves with respect to the primary, a commutator on said primary, brushes located along at least two displaced axes, at least two displaced windings on the secondary, each secondary winding being connected to brushes located along one of the brush axes to set up conduced ampereturns in said winding, different windings on the secondary being connected to brushes located along different axes, the angular displacement of the axes along which the brushes are disposed differing from the angular displacement of the axes of the windings on the secondary, and one brush axis approximately coinciding with the axis of the secondary winding to which the brushes in said axis are connected.

4. A synchronous motor which carries variable load at synchronous speed, having a primary and a secondary member, said primary member being adapted to produce a primary flux which revolves with respect to the primary, $n$ displaced windings on the secondary in inductive relation to the primary flux, said primary flux generating a voltage in each secondary winding, thus forming a system of $n$ phase-displaced secondary generated voltages, a source of $n$ auxiliary voltages, said voltages being of slip frequency and differing in phase at sub-synchronous motor speeds, becoming unidirectional at synchronism and having an amplitude independent of their frequency, means for impressing one auxiliary voltage on each secondary winding, different auxiliary voltages being impressed on different secondary windings, and the phase differences between the generated voltages differing from the phase differences between the auxiliary voltages.

5. The method of operating a motor which carries variable load at synchronous speed, comprising, producing a primary flux which revolves with respect to the primary, causing the primary flux to generate $n$ sets of phase displaced induction-motor-torque producing ampereturns in displaced secondary circuits, producing $n$ auxiliary voltages of slip frequency, which differ in phase below synchronism and become unidirectional at synchronism, the phase differences between the auxiliary voltages differing from the phase differences between the induction-motor-torque producing ampereturns, and impressing the $n$ auxiliary voltages on the $n$ induction-motor-torque producing secondaries, to synchronize the motor and to thereafter hold it in synchronism over a range of loads.

6. The method of operating a motor which carries variable load at synchronous speed, comprising, producing a primary flux which revolves with respect to the primary, causing the primary flux to generate $n$ sets of phase displaced induction-motor-torque producing ampereturns in displaced secondary circuits, producing $n$ auxiliary voltages of slip frequency, which differ in phase below synchronism and become unidirectional at synchronism, and impressing the auxiliary voltages on the induction-motor-torque producing secondaries to produce $n$ sets of conduced ampereturns on the secondary the maxima of two of which sets differ in magnitude, to synchronize the motor and to thereafter hold it in synchronism over a range of loads.

In testimony whereof I affix my signature this 30th day of July, 1926.

VALÉRE A. FYNN.